May 18, 1937.  C. A. OTTO  2,080,950
TEMPERATURE CONTROL DEVICE
Filed Nov. 16, 1935
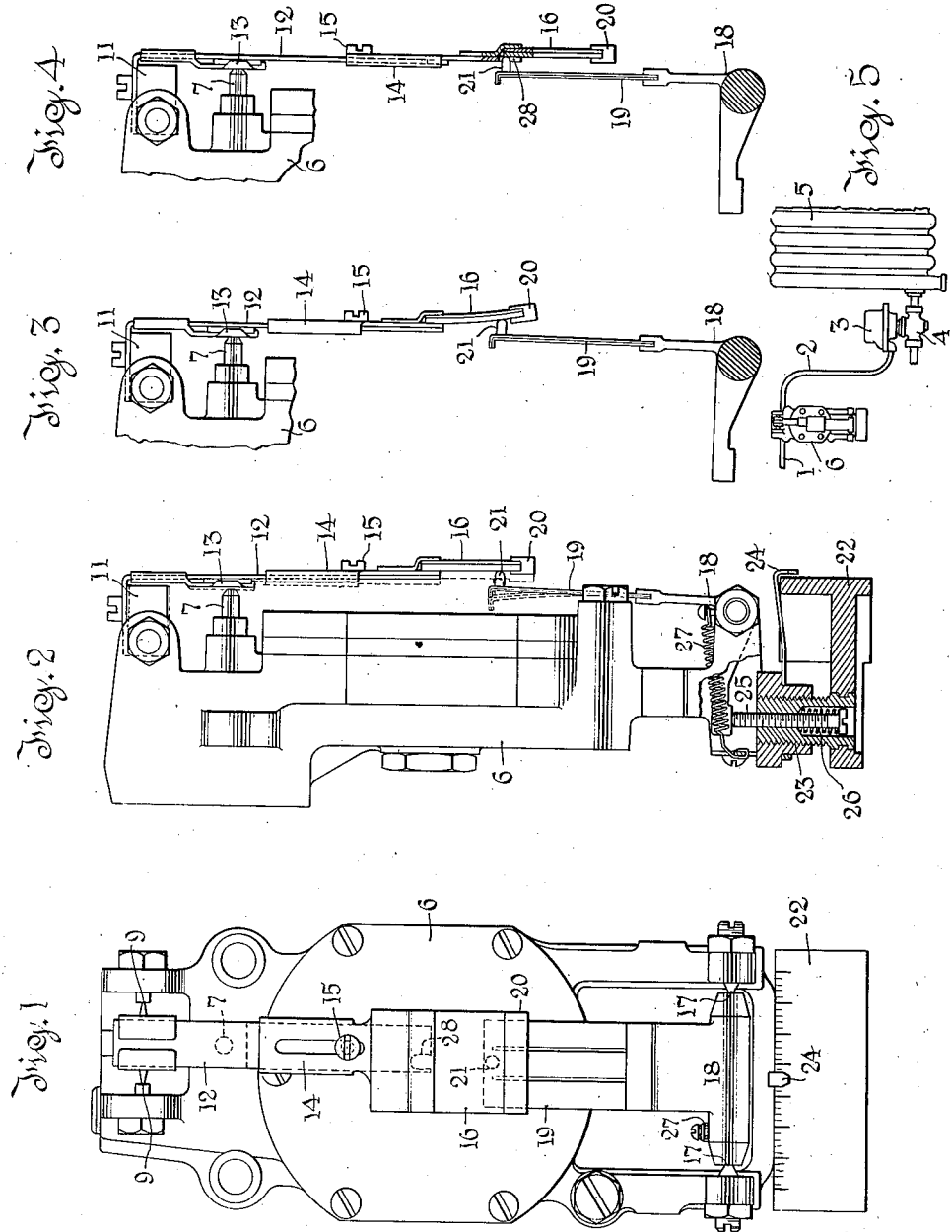
Inventor
Carl A. Otto
Attorneys Patented May 18, 1937

2,080,950

UNITED STATES PATENT OFFICE 2,080,950

TEMPERATURE CONTROL DEVICE

Carl A. Otto, Milwaukee, Wis., assignor to Johnson Service Company, Milwaukee, Wis., a corporation of Wisconsin Application November 16, 1935, Serial No. 50,195

7 Claims. (Cl. 236—1)

This invention relates to temperature control, and particularly to means for modifying the action of a dry bulb thermostat in response to changes of atmospheric humidity, whereby the best comfort conditions are attained or at least approximated.

Generally stated, under winter (heating) conditions, if relative humidity is not controlled, and consequently is quite widely variable, the control point for thermostatic control should be raised slightly as relative humidity falls. An acceptable relation under heating conditions is to increase the dry bulb control point 1° F. for a reduction of 8% or 9% in relative humidity, but this relation is by no means fixed, so that there is need for some means for adjusting the effect produced by atmospheric humidity.

The present invention provides a simple construction in which the participation of atmospheric humidity as a control factor may be adjusted from zero to any value considered desirable.

Another feature of the invention is the use of a flexing bi-metallic thermostatic element in conjunction with a flexing so-called "bi-wood" humidity responsive element; and more specifically their use in a combination which permits the adjustment above described.

While the combined control will be described as raising the temperature control point in response to falling relative humidity, this relationship might be reversed in any case where such reversal might be considered desirable, without affecting the mechanical aspects of the combined control. Further the broad inventive concept can be embodied in structures using specifically different responsive elements.

The preferred embodiment of the invention will now be described with reference to the accompanying drawing, in which:

Fig. 1 is a front elevation of a pneumatic relay thermostat with the invention applied.

Fig. 2 is a side elevation thereof, partly in section.

Fig. 3 is a fragmentary view illustrating the flexure of the bi-wood element with rising humidity.

Fig. 4 is a similar fragmentary view showing the bi-wood element adjusted to its inactive position.

Fig. 5 is a diagram of the control system.

Referring first to Fig. 5, I represents an air supply line leading to a relay 6 which is thermostatically controlled, as will be hereinafter more fully explained. From the relay 6 a branch line 2 leads to the motor 3 which actuates means for controlling the supply of a temperature changing medium. This controlling means is illustrated in Fig. 5 as a valve 4 controlling flow to a radiator 5. This general system of control will be recognized as conforming to standard practice by applicant's assignee and is described primarily to establish the fact that the mechanism hereafter described is used to control a temperature changing medium and exercises no direct control on atmospheric humidity.

Referring now to Figs. 1 and 2, it will suffice to say that the relay valve mechanism, generally indicated by the numeral 6, is illustrated as conforming in structure to the progressively acting pneumatic relay shown in the Otto Patent 1,500,260, issued July 8, 1924. In this device variable throttling of the leak port 7 effects the control. Stated differently, throttling of the leak port 7 establishes a variable pressure in the branch line 2 and consequently variable energization of the motor 3 which actuates the valve 4.

It will be readily understood by those skilled in the are that various types of pneumatic relay controllable by a leak port are known and that the general function of the relay is to accelerate the response of the controlling device. It will also be recognized that certain systems are in use in which the relay is omitted entirely and in which the leak port exercises direct control on the motor. The invention is applicable to systems of this known type without any change in inventive principle.

Mounted in pivots 9 near the top of the relay is a weighted saddle 11 to which is affixed a pendant bar 12. Carried by bar 12 is a valve or lid 13 which coacts with leak port 7 and variably throttles the same. The valve has a closing tendency under the action of gravity.

Slidably mounted on bar 12 is a clip 14 which may be clamped in adjusted position on the bar by means of screw 15. Clip 14 carries the bi-wood element 16 which forms a prolongation of the bar 12. The element 20 is merely a confining clip on the lower end of the bi-wood element.

Mounted in pivots 17 near the lower margin of the relay is a saddle 18 which carries an upstanding bi-metallic thermostatic bar 19. Bar 19 has, at its upper end, a finger 21 which engages the bi-wood element 16.

The saddle 18 is adjustable to determine the position of bar 19, by means of a swinging dial 22 whose stem is threaded at 23 in the frame of the relay. A combined detent and pointer 24 coacts with the dial. A screw 25 threaded in the stem of the dial engages a portion of saddle 18 and offers means to zero the instrument. Screw 25 is frictionally held, a spring 26 being used to increase its resistance.

In use adjustments are made by swinging the dial. A tension spring 27 holds the saddle in engagement with the screw 25.

Assume, for purpose of explanation, that increased throttling of leak port 7 has a temperature reducing effect. In such case bar 19 would be arranged to flex inward (see dotted line position, Fig. 2) on rise of temperature. If the bi-wood element is to lower the control point on rise of relative humidity, it would be arranged to flex outward (as in Fig. 3) on rise of humidity. In Figs. 2 and 3 the flexures are exaggerated to make them clearly visible. It should be understood that these elements might, under certain conditions, flex in the reverse direction, so that a straight condition would be an intermediate position as to the total range of flexure.

Adjustment of the participation of bar 16 in the combined control is effected by shifting clip 14. In the upper position (Figs. 2 and 3) the bi-wood element exercises its maximum effect. Lowering of the clip diminishes the effect of humidity on the temperature control, and this becomes negligible when finger 21 engages the upper end of bi-wood element 16 adjacent the lower margin of clip 14. If it be desired to make certain that the bi-wood element is completely ineffective, the adjustment of clip 14 shown in Fig. 4 may be made, in which finger 21 engages a notch 28 in the rear face of clip 14. The notch 28 is used to bring the point of contact into plane with the rear face of the bi-wood element. Hence it is not necessary to re-zero the instrument.

While the arrangement adopted is preferred, others are possible. For example, increased throttling of the leak port may be given a temperature increasing effect and this would require reversal of the controlling elements to give the same controlling action as above described. Reversal of the bi-wood element without reversal of the thermostatic element would cause raising of the dry bulb temperature control point on rising relative humidity.

Various elements responsive to dry bulb atmospheric humidity are known and certain of these can be substituted.

What is claimed is:—

1. The combination of a controlling device, including a swinging arm; a thermostatic device, including a member moving in response to temperature changes, in the direction of motion of said arm; means carried by said arm and adapted to swing in the direction of motion of said arm in response to humidity changes, said temperature responsive member and said humidity responsive means being arranged in driving relation to each other; and adjusting means for varying the effective length of said humidity responsive means.

2. The combination of a controlling device, including a swinging arm; a thermostatic device including a bi-metallic, bar-like member flexing in response to temperature changes, in the direction of motion of said arm; a bi-wood, bar-like element forming a prolongation of said arm and adapted to flex in the direction of motion of said arm in response to humidity changes, said member and said element being arranged in partially overlapping relation and having a movable point of contact providing a driving connection therebetween; and means for adjusting the element on said arm to change the point of contact between said member and said element and thereby vary the effective length of the element.

3. The combination of a pressure controlling device, including a leak port and a valve for variably throttling said leak port; humidity responsive means carried by and adapted to control the position of said valve; and thermostatic means arranged to actuate the valve through said humidity responsive means.

4. The combination of a pressure controlling device, including a leak port and a valve for variably throttling said leak port; humidity responsive means carried by and adapted to control the position of said valve; and thermostatic means arranged to actuate the valve through said humidity responsive means, said humidity responsive means being adjustable to vary the effect thereof upon said valve.

5. The combination of a controlling device, including a swinging arm; a thermostatic device, including a member moving in response to temperature changes, in the direction of motion of said arm; an adjustable driving connection between said arm and said member, including an element adapted to swing in the direction of motion of said arm in response to humidity changes; and means for adjusting said connection to vary the effective length of said element.

6. The combination of a controlling device; a thermostatic device, including a member moving in response to temperature changes; and a driving connection between said controlling device and said member, including an element adapted to swing in response to humidity changes, said connection being adjustable between a position in which said element affects said controlling device and a position in which said element is ineffective to operate the controlling device.

7. The combination of a controlling device; thermostatic means, including a member which moves in response to temperature changes; and humidity responsive means carried by said controlling device, said humidity responsive means being adjustable on said controlling device between two different positions, in one of which it cooperates with the moving element of said thermostatic means to subject the controlling device to conjoint control by the humidity responsive means and the thermostatic means, and in the other of which it establishes a direct actuating connection between the thermostatic means and said controlling device.

CARL A. OTTO.